March 11, 1958 J. C. LABRIE Re. 24,443

SLIDING DOOR LOCK

Original Filed March 27, 1953 2 Sheets-Sheet 1

Joseph C. Labrie

INVENTOR.

BY Clarence A. O'Brien and Harvey B. Jacobson

Attorneys

SLIDING DOOR LOCK

Original Filed March 27, 1953 2 Sheets-Sheet 2

Joseph C. Labrie
INVENTOR.

BY Clarence A. O'Brien and Harvey B. Jacobson
Attorneys

United States Patent Office

Re. 24,443
Reissued Mar. 11, 1958

24,443

SLIDING DOOR LOCK

Joseph C. Labrie, Miami, Fla.

Original No. 2,744,406, dated May 8, 1956, Serial No. 345,075, March 27, 1953. Application for reissue December 18, 1956, Serial No. 629,207

12 Claims. (Cl. 70—96)

Matter enclosed in heavy brackets [ ] appears in the original patent but forms no part of this reissue specification; matter printed in italics indicates the additions made by reissue.

This invention relates generally to door lock mechanisms and pertains more particularly to an improved lock mechanism for sliding doors.

A primary object of this invention is to provide an improved form of lock construction for sliding doors which incorporates a plurality of interengaging and interlocking parts.

Another object of this invention is to provide an improved form of lock mechanism which incorporates both a key controlled and manually controlled locking assembly, each incorporating interengaging mechanism for cooperative actuation.

Another object of this invention is to provide a locking mechanism which includes a latching element which serves to maintain the key controlled lock in proper position.

Another object of this invention is to provide a locking mechanism which includes a latching element and a bolt actuating cam, the element serving to maintain the cam in proper position on the lock mechanism.

Another object of this invention is to provide a locking mechanism for sliding doors which is of extremely compact and economical design.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
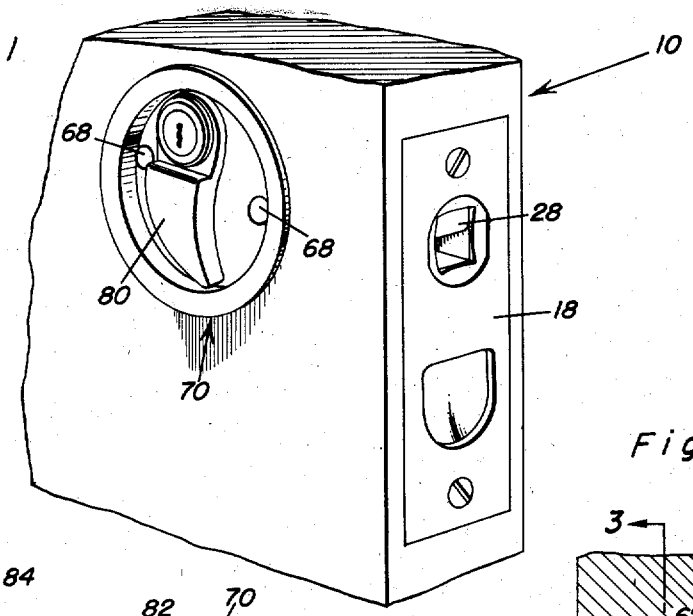
Figure 1 is a perspective of a portion of a sliding door incorporating the novel locking mechanism.
Figure 5:
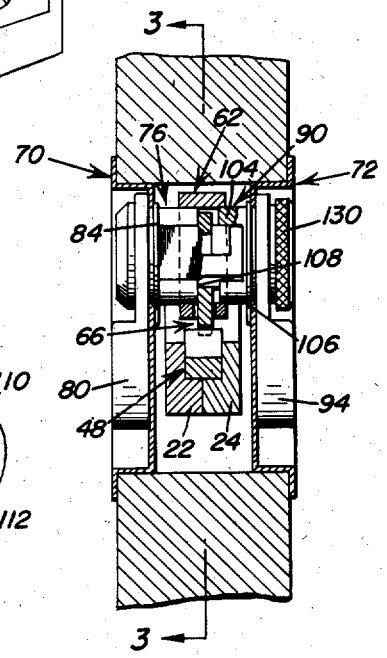
Figure 5 is a transverse vertical section taken substantially along the plane of section line 5—5 of Figure 3 showing details of the internal construction of the combined latching and locking mechanism.
Figure 2:
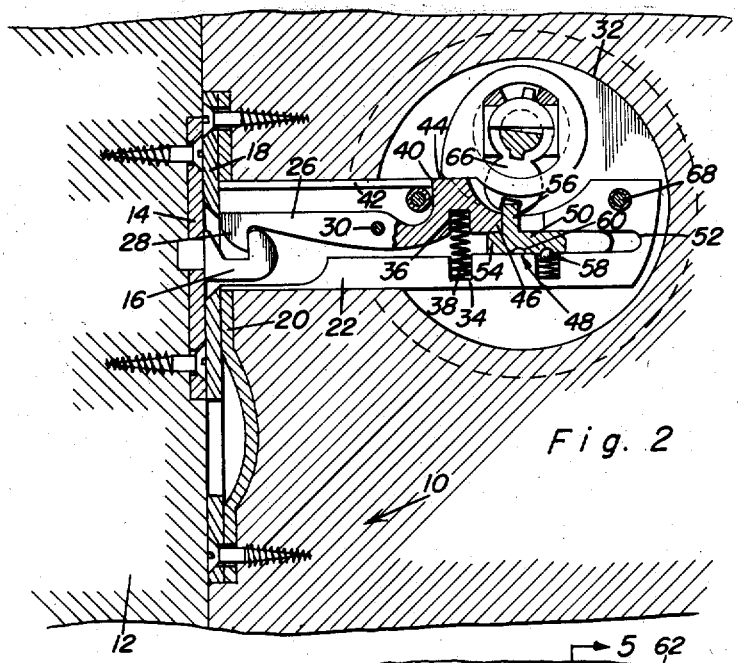
Figure 2 is a vertical section taken through the sliding door and its adjacent casing showing details of the mechanism in the locked position.

Referring now more particularly to Figures 1 and 2, reference numeral 10 indicates generally a sliding door which is movable toward and away from the door casing 12 which is provided with a mounting plate 14 including the horizontally extending hook 16. The door carries a face plate 18 below which is disposed a guide plate 20 recessed into the edges of the door as shown and these two plates are provided with registering apertures through which the hook 16 projects when the door is closed. A recess is provided in the door behind these plates and receives a pair of mating plates 22 and 24, see especially Figure 5, which are provided with cooperating recesses receiving the *bolt or* dog 26 terminating at one end in a hook portion 28 for engagement with the hook 16 and which is pivoted intermediate its length by means of the pin 30. The door is provided with a transverse opening 32 into which the rearward end of the plates 22 and 24 as well as the rearward end of the dog project and each of the latter are provided with corresponding depressions 34 and 36 receiving the opposite ends of a compression spring 38 serving to normally urge the dog to the position shown in Figure 2. The rear corner 40 of the dog abuts against the inwardly directed flanges 42 on the plates 22 and 24 to serve as a limit stop for the dog and the upper face 44 adjacent this corner constitutes a cam surface as will presently appear. Also, the extreme rear end 46 of the dog constitutes, a locking shoulder for the same which is selectively engageable by the sliding locking member 48 which is projectable into and out of locking engagement with the dog by virtue of its extended guide portion 50 received within the corresponding recess 52 in the plates 22 and 24, the shoulder 54 being engageable under the rear end *46* of the dog [46] *26* and the member as a whole being moved as will presently appear by virtue of its ear 56 which also serves as a stop for limiting the projected position of this sliding member. The spring urged ball 58, of course, serves to maintain the sliding member in the desired position by virtue of its projection into one of the depressions 60.

Figure 3:
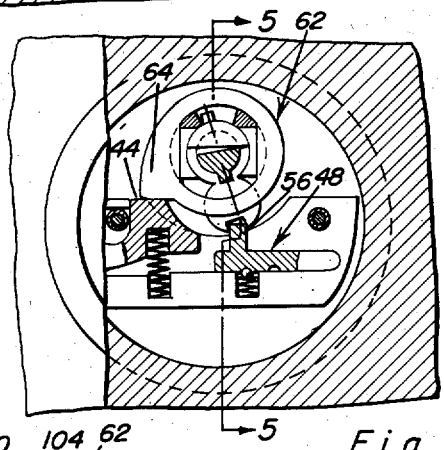
Figure 3 is a vertical section taken substantially along the plane of section line 3—3 of Figure 5 showing details of the assembly in the unlocked position.
Figure 8:
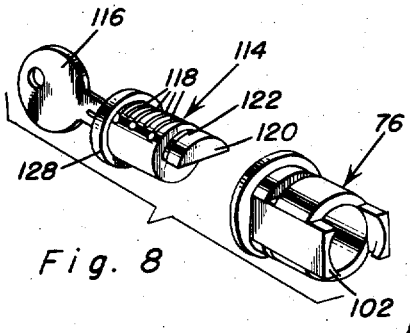
Figure 8 is an exploded perspective view of a portion of the assembly including the key controlled cylinder and [valve] *barrel* mechanism.
Figure 4:
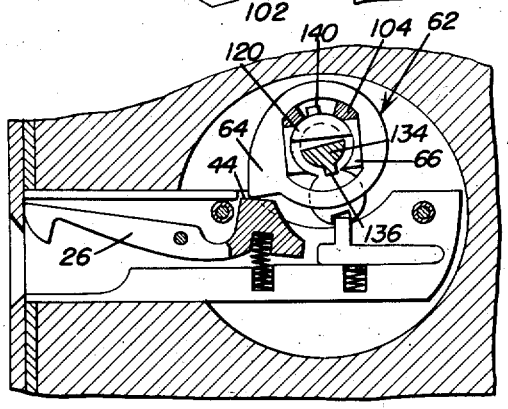
Figure 4 is a vertical section similar to that of Figure 2 but showing the relationship of parts of the mechanism in the latch releasing position.

As far as the operation of the above described assembly is concerned, the dog is moved from a latched to an unlatched position under action of the cam member 62 provided with the cam projection 64 engaging against the cam surface 44 of the dog, these two positions being shown most clearly in Figures 3 and 4. The sliding member 48 is movable between the locked and unlocked position as shown in Figures 2 and 3 respectively under engagement of its ear 56 with the oscillatable element 66.

Figure 6:
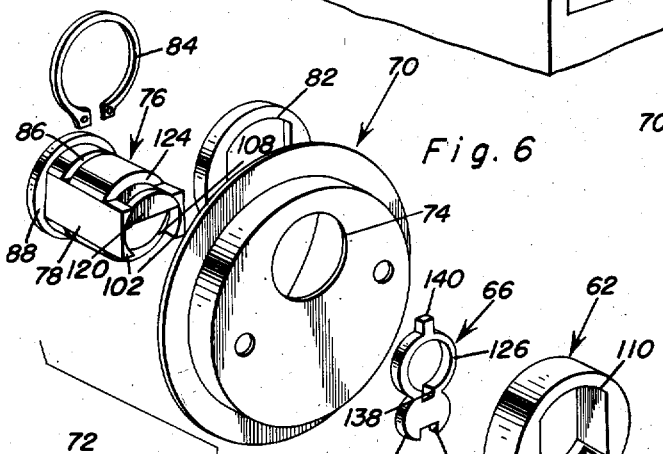
Figure 6 is an exploded view of a portion of the assembly.
Figure 7:
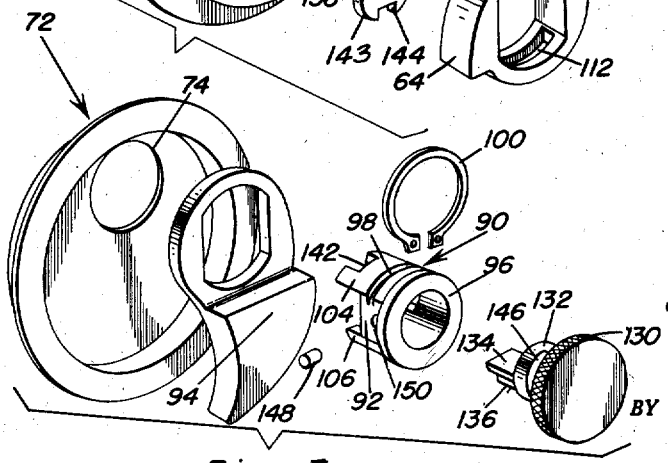
Figure 7 is another exploded view showing the remainder of the assembly.

Referring now more particularly to Figures 6 and 7, it will be seen that a pair of escutcheon plates, namely, an outer plate 70 and an inner plate 72 are provided on opposite sides of the door in covering relation to the opening therethrough and these escutcheons are provided with apertures 74 rotatably receiving the opposite ends of a combined unlatching and locking mechanism. *The escutcheons are each formed with a recess that opens outwardly of the surface of the sliding door 10.* These escutcheons are secured to plates 22 and 24 by means of suitable fasteners 68, those in the outer escutcheon being provided with smooth heads so that they cannot be removed from the outside of the door. This assembly includes a tubular outer member 76 of generally cylindrical configuration which is provided at diametrically opposed points with flats 78 which serve to feather an operating lever 80 thereon, the lever being provided with a similarly configurated aperture 82. In assembled operation, this member first receives the lever 80 and is then projected through the opening 74 on the escutcheon and a locking clip 84 is engaged within a peripheral slot or groove 86 in the member which, in cooperation with the radial flange 88 serve to maintain this member in proper position on the escutcheon.

A second tubular member 90 is provided with flats 92 similar to those on the first member for feathering the inner operating lever 94 thereon, this member being provided with a collar 96 and a groove 98 cooperating with the clip 100 in securing the member and lever 94 to the escutcheon 72 in a manner similar to the other member.

The two members are provided with interfitting or interlocking inner ends so that rotation of one member will effect rotation of the other and this interlocking engagement is provided by a pair of diametrically opposed substantially rectangular extensions 102 on the front member 76 and a pair of circumferential extensions 104 and 106 on the second member 90, these pairs of extensions being disposed in right angular relation to each other for interlocking engagement. In this respect, it will be noted that the extension 104 is longer than the extension 106 so that the latter is slightly spaced from the lower end face 108 on the first member 76 to provide therebetween an elongated slot, see especially Figure 5. The previously described cam element 62 is provided with a central aperture 110 conforming to the shape of the outer surface of the members so that the cam element is carried and rotated thereby and this cam element is provided along its undersurface with an elongated slot 112 which is positioned in register with the previously mentioned slot defined between the extension 106 and face 108 so that the previously described latch actuating element 66 which extends radially outwardly through these slots will properly position the cam element longitudinally of the member 76.

The members 76 and 90 [present] *form* a housing having a longitudinal circular bore therethrough which rotatably receives the locking mechanism which will now be described. The first member 76 receives a lock barrel 114 which is controlled by a key 116 in a well known manner to disengage the various tumblers 118 from corresponding recesses in the inner surface of the member 76, as is well known, so as to allow relative rotational movement between the barrel 114 and the member 76. The barrel is provided with an extension 120 having an arcuate groove 122 which projects beyond the upper end face 124 of member 76 between the *extensions* [extension] 102 and the annular rim 126 of oscillatable element 66 is seated within this groove 122 serving to maintain the barrel in proper position with respect to the member 76, the collar 128 of the barrel being removable to permit assembly.

The inner end of the lock assembly is provided with a manually actuated knob 130 and the cylindrical projection 132 on the knob is received within the bore of member 90 as is the semi-circular extension 134 which, when the device is assembled, overlaps the extension 120 on the lock barrel. It is to be noted that the two extensions 120 and 134 mate in such a manner as to allow a certain amount of lost motion between the lock barrel 114 and the knob 130. The amount of lost motion provided is such as to permit the sliding locking member 48 to be moved between the locked and unlocked positions by manipulation of knob 130 without imparting any movement to the lock barrel. At the same time, when the sliding locking member 48 is moved to the locked position by actuation of the lock barrel, the lost motion will permit the lock barrel to be returned to the normal position, wherein removal of the key can be accomplished, without disturbing the then locked position of the element 66 and consequently the member 48. Likewise, the same action takes place upon unlocking the assembly by means of the key 116, the lost motion permitting the lock barrel to be rotated back from the unlocking to the normal position, wherein the key may be removed from the barrel, without disturbing the then unlocked position of member 48. The extension 134 is provided with a depending key 136 which is received within the keyway 138 of the oscillatable element 66 so that rotation of this knob assembly will transmit oscillatory motion to the oscillatable element, it being noted that the radially projecting ear 140 on the oscillatable element is disposed within a corresponding notch 142 on the upper extension 104 of the first member 90 to provide a stop limit for the oscillatory motion of the oscillatable element. The depending projection 143 extends outwardly through the previously mentioned slot between extension 106 and the face 108 and the slot 112 and its lower end is provided with a notch 144 which engages over the ear 56 of the sliding member 48. To maintain the knob assembly in assembled relation with respect to the member 90, the cylindrical portion 132 of the former is provided with an elongated slot 146 into which the pin 148 extending through aperture 150 in the member 90 projects, the pin being prevented from disengagement by virtue of its engagement with the inner surface of the aperture in the lever 94.

The operation of the device will now be apparent inasmuch as actuation of either of the levers 80 or 94 will impart a rotational movement to the housing comprised of the members 76 and 90 which will, in turn, impart a rotational movement to the cam assembly 62 to pivot the dog 26 to unlatch the door assembly. When it is desired to lock the same, it is merely necessary to rotate either the manual knob 130 to impart rotary motion to the oscillatable element 66 or rotate the lock barrel 114 under action of the key 116 to accomplish the same result.

It will be noted that the locking device is extremely compact in design so that it may be easily incorporated in a door no matter how thin the latter may be constructed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A combined locking and actuating assembly comprising a pair of coaxial tubular members provided with interfitting adjacent ends [presenting] *providing* an elongated housing, means for rotating said housing, a bolt actuating cam carried by said housing provided with a circumferential slot, locking means received in said housing including an element projecting from the housing through the slot in said cam, said locking means including a key controlled barrel, said barrel having a groove within which said element is journaled, said locking means also including mechanism for imparting rotational movement of said barrel to said element.

2. Combined locking and actuating assembly as set forth in claim 1 wherein said means for rotating said housing includes actuating lever means operatively connected to opposite outer end portions of said tubular members and rotatable therewith. [for imparting rotational movement to the barrel and the element journaled therein.]

*3. For use with a sliding door that has a first bore and a second bore, said first bore extending through a surface of the door and the second bore extending through an edge of the door and joining said first bore, a door latch and lock comprising the combination of an escutcheon that has a portion located in said first bore, a bolt disposed in said second bore, means pivotally mounting said bolt in said second bore, said escutcheon having an opening, an operating lever disposed adjacent to said portion of said escutcheon, means including a tubular member rotatively disposed in said opening of said escutcheon for mounting said lever for swinging movement adjacent to said escutcheon portion, mechanical means drivingly connected to said tubular member and protruding laterally from the axis of rotation of said member and operatively connected to said bolt to actuate said bolt in response to movement of said lever in one direction, a lock mounted in said first bore and located at least in part within said tubular member, and means actuated by said lock for*

*holding said bolt in a fixed position in response to actuation of said lock.*

*4. For use with a horizontally sliding door that has a first larger bore of circular cross-section extending through the front and rear surfaces thereof and a second smaller bore of circular cross-section perpendicular to the first bore and extending through one edge of the door, a door latch and lock comprising the combination of a pair of escutcheon plates each having a portion located in said first bore and spaced from each other, said escutcheon plates located at opposite ends of said larger bore, a bolt disposed in said second bore, means pivotally mounting said bolt in said second bore, said escutcheon plates having a pair of aligned openings, an operating lever disposed in juxtaposition to one of said escutcheon plates, at least one of said escutcheon plates having a recess, means including a tubular outer member in one of said escutcheon plate openings for mounting said lever for swinging movement within the recess of said one of said escutcheon plates, a cam drivingly connected to said tubular outer member and operatively engaging a part of said bolt to actuate said bolt in response to lever movement in one direction, and means including a key controlled lock in said tubular outer member for latching said bolt in one pivotal position at which said cam prevents said lever from being actuated in one direction.*

*5. A latch and lock for use in a horizontally sliding door that is formed with a first and second intersecting bore with said second bore opening through an edge of the door, said latch and lock comprising a rotary hollow housing located in said first bore and at right angles to said second bore, a pair of escutcheons, one of said escutcheons having a recess which opens outwardly of one surface of the door, said escutcheons having apertures through which said hollow housing opens, a rotary locking mechanism in said housing, an operating lever mounted on said housing and located in the recess in said one of said escutcheons, the axis of rotation of said housing coinciding with the axis of rotary movement of said locking mechanism, said locking mechanism having such dimensions so as to fit almost entirely within the space between said escutcheons, a bolt mounted in said second bore, means including a cam and drivingly connected with said rotary hollow housing for actuating said bolt, said bolt mounted for pivotal movement within said second bore, said cam being in contact with said bolt so that upon actuation of said lever said bolt is pivotally operated, and means connected with and operated by said locking mechanism for preventing said bolt from being pivotally actuated.*

*6. In a sliding door which has a first and a second intersecting circular bore, a combination latch and lock comprising a pair of escutcheons each having a part recessed within said first bore, a lock mechanism which includes a barrel, said escutcheons having a pair of aligned openings, a rotary hollow housing in said openings, said barrel mounted in said housing, a lever located adjacent to one of said escutcheons and secured to said housing, said lever mounted for oscillation about an axis coincident with the axis of movement of said barrel, a bolt disposed in said second bore, means actuated in response to movement of said lever and in contact with said bolt for operating said bolt in response to movement of said lever in one direction, which direction is the same as the opening movement of said sliding door whereby the door may be unlatched and pulled to an open position by a single continuous force applied on said lever in one direction, and means mounted in said first bore and movable in response to movement of said barrel for preventing said bolt from moving.*

*7. In a sliding door which has a first and a second intersecting bore, a pair of escutcheon plates each having a portion fitted within said first bore, a bolt in said second bore, said escutcheon plates having a pair of openings, a rotary hollow housing mounted in said openings of said escutcheon plates, a lock mechanism including a key controlled barrel in said housing, means including a lock member movable to a position which prevents the bolt from moving and to a position which frees said bolt for movement in response to actuation of said barrel, a lever connected to said rotary housing and mounted adjacent to one of said escutcheons, the axis of rotation of said barrel coinciding with the axis of rotation of said housing, and means drivingly connected with said housing and said bolt to actuate said bolt in response to movement of said lever in one direction.*

*8. The combination of claim 7 wherein there are means adjacent to the escutcheon plate opposite to that which has said lever thereadjacent for actuating said rotary housing.*

*9. The combination of claim 7 wherein there are resilient means biasing said bolt in one direction and wherein said bolt is mounted pivotally within said second bore and has an end projecting into said first bore.*

*10. The combination latch and lock of claim 6 wherein said means mounted in said first bore and movable in response to movement of said barrel for preventing said bolt from moving comprise a sliding locking member in said first bore, an oscillatable element in said first bore and drivingly connected to said sliding locking member, and a shoulder on said sliding locking member engageable with said bolt to prevent the bolt from moving.*

*11. The combination latch and lock of claim 6 wherein there is a second lever located adjacent to the other of said escutcheons, said second lever drivingly connected to said rotary hollow housing to oscillate the same in response to movement of said second lever adjacent to said other escutcheon, said lock mechanism barrel being key controlled and having a key slot accessible by an opening through one end of said barrel and adjacent to said one of said escutcheons, and means adjacent to the other of said escutcheons and mounted within said hollow housing and engageable with said bolt movement preventing means to actuate said bolt movement preventing means from the opposite side of the sliding door from that having the key slot.*

*12. The door latch and lock of claim 3 wherein said means actuated by said lock for holding said bolt in a fixed position in response to actuation of said lock include a locking member that has a shoulder, a locking shoulder on said bolt and contacted by the shoulder on said locking member when said locking member is in position to prevent said bolt from moving.*

References Cited in the file of this patent or the original patent

UNITED STATES PATENTS

| | | |
|---|---|---|
| 258,986 | Burk | June 6, 1882 |
| 414,332 | Seely | Nov. 5, 1889 |
| 618,486 | Stanley | Jan. 31, 1899 |
| 723,239 | Butler | Mar. 24, 1903 |
| 809,424 | Caley et al. | Jan. 9, 1906 |
| 1,029,748 | Giese | June 18, 1912 |
| 1,272,417 | Gee | July 16, 1918 |
| 1,275,403 | Cwiklinski | Aug. 13, 1918 |
| 1,316,329 | Rixson | Sept. 16, 1919 |
| 1,372,481 | Carlson | Mar. 22, 1921 |
| 2,089,145 | Hurd | Aug. 3, 1937 |
| 2,387,187 | Smith | Oct. 16, 1945 |
| 2,666,319 | Price | Jan. 19, 1954 |

FOREIGN PATENTS

| | | |
|---|---|---|
| 232,078 | Switzerland | July 17, 1944 |
| 313,666 | Italy | Jan. 2, 1934 |